United States Patent [19]
Baurand et al.

[11] Patent Number: 5,955,859
[45] Date of Patent: Sep. 21, 1999

[54] INTERFACE MODULE BETWEEN A FIELD BUS AND ELECTRICAL EQUIPMENT CONTROLLING AND PROTECTING AN ELECTRIC MOTOR

[75] Inventors: Gilles Baurand, Montesson la Borde; André Ganier, Chatou; François Roussel, Rueil-Malmaison, all of France

[73] Assignee: Schneider Electric SA, Boulogne-Billancourt, France

[21] Appl. No.: 08/626,778

[22] Filed: Apr. 2, 1996

[30] Foreign Application Priority Data

Apr. 3, 1995 [FR] France .................................. 95 03867

[51] Int. Cl.⁶ .................................................. G05B 11/14
[52] U.S. Cl. ........................ 318/672; 318/558; 318/568.1
[58] Field of Search ..................... 318/778–797, 318/671, 672, 568.1–568.11, 685, 696, 558

[56] References Cited

U.S. PATENT DOCUMENTS

| | | | |
|---|---|---|---|
| 4,257,103 | 3/1981 | Suzuki et al. ...................... | 364/474.11 |
| 4,689,541 | 8/1987 | Jones et al. ............................... | 318/696 |
| 4,931,712 | 6/1990 | DiGiulio et al. ......................... | 318/625 |
| 4,962,338 | 10/1990 | Daggett et al. ..................... | 318/568.11 |
| 5,212,430 | 5/1993 | Jartyn ......................................... | 318/34 |
| 5,237,250 | 8/1993 | Zeile et al. ............................... | 318/562 |
| 5,293,102 | 3/1994 | Martinson et al. .......................... | 318/2 |

FOREIGN PATENT DOCUMENTS 0 391 143  10/1990  European Pat. Off. .
93 11 725  11/1993  Germany .

*Primary Examiner*—Brian Sircus
*Attorney, Agent, or Firm*—Oblon, Spivak, McClelland, Maier & Neustadt, P.C.

[57] ABSTRACT

The present invention concerns an interface module between a field bus and electrical equipment controlling and protecting an electric motor. The interface module includes an integrated circuit having data pins connected via input/output circuits to contacts or binary sensors or to coils or actuators of the electrical equipment. The data pins of the integrated circuit are connected via logic circuits to inputs or outputs which are greater in number than the data pins. The inputs/outputs are connected to coils or actuators and to auxiliary contacts or binary sensors of the electrical equipment.

9 Claims, 6 Drawing Sheets

INTERFACE MODULE BETWEEN A FIELD BUS AND ELECTRICAL EQUIPMENT CONTROLLING AND PROTECTING AN ELECTRIC MOTOR

BACKGROUND OF THE INVENTION

1. Field of the Invention:

The present invention concerns an interface module between a field bus and electrical equipment controlling and protecting an electric motor, this module including an integrated circuit having data pins connected via interface circuits to contacts (or binary sensors) and to coils (or actuators) of the electrical equipment.

2. Discussion of the Background:

Various combinations of electrical devices known as motor starters are used to control and protect electric motors, including direct on-line starters, reversing starters, star-delta starters and progressive starters.

The control function of such equipment uses one or more contractors. The functions which protect the motor against overload, phase imbalance and short-term overcurrents are implemented by various devices or modules: thermal overload relay, motor circuit-breaker, thermal overload protection module incorporated into a motor circuit-breaker or thermal-magnetic module added to a contactor/circuit-breaker.

Consideration has already been given to controlling circuit-breakers via a communication bus which is part of an industrial local area network. This form of control is not suitable for electric motors.

The ASI (Actuator Sensor Interface) field bus for sensors and actuators is used to connect binary actuators and sensors via interface modules, the bus being also connected to a control brain (PC, programmable automatic controller, etc). The bus is a two-wire bus and carries the power supply to the sensors and the information signals travelling between the interface modules. Each module comprises electronic circuitry including an integrated circuit and can drive four standard actuators or read the outputs of four standard sensors, or provide a combination of two inputs with two outputs. The electric circuitry of the module processes data on four bits for each sensor (input) or each actuator (output).

The above interface module cannot be used for motor control since the number of items of data to be processed exceeds four in this case.

SUMMARY OF THE INVENTION

An object of the present invention is to provide interface modules capable of controlling various equipments for controlling and protecting an electric motor, retaining the standard (4-bit) data configuration defined in the standard for the ASI field bus. Each module has a safety function which terminates control in the event of breakdown of the dialogue between the module and the master module. In the event of a fault, for example an earthing fault, the environment is not disturbed as the fault is dealt with by the network without disturbing the environment. The use of the module and the associated network simplifies the wiring between an automatic controller controlling the network and the motor starters and maximizes use of the capabilities of the automatic controller.

The module of the invention is characterised in that the data pins of the integrated circuit are connected via logic circuits to inputs or outputs connected to coils or actuators and to auxiliary contacts or sensors of the electrical equipment. The number of inputs/outputs is larger than the number of data pins.

According to one feature, each input/output data pin executes a command or detects a standard state regardless of the type of motor starter.

According to another feature, a first data pin corresponds to an on/off bit, the second data pin corresponds to an open/closed bit, the third data pin corresponds to a fault/no fault bit, and the fourth data pin corresponds to an "on" bit.

According to another feature, the module includes a monitor logic circuit detecting absence of dialogue between the module and the bus and operating on a logic circuit controlling the on/off output(s).

In accordance with another feature, the first data pin and the second data pin of the integrated circuit are bidirectional and are connected via a logic circuit to outputs designed to be connected to coils or actuators of the electrical equipment which is a reversing motor starter and are connected via a logic circuit to two inputs adapted to be connected to auxiliary contacts or binary sensors associated with said actuators or coils.

In accordance with one feature, the integrated circuit is connected via a first data pin and via a logic circuit to three outputs adapted to be connected to coils or actuators of the electrical equipment which is a star-delta motor starter.

In accordance with one feature, the module includes a sequence monitor circuit the output of which is connected to the third data pin of the integrated circuit and receives signals from three inputs connected to auxiliary contacts.

In accordance with one feature, the interface module is characterised in that it includes a logic circuit having its output connected to a fourth data pin of the integrated circuit and receiving the signal from an auxiliary contact or binary sensor input and the output signal of a local control unit.

BRIEF DESCRIPTION OF THE DRAWINGS

The invention will now be described in more detail and by way of example with reference to embodiments shown in the appended drawings, in which.

DESCRIPTION OF THE PREFERRED EMBODIMENTS

The device of the invention controls a three-phase electric motor M connected to a three-phase power supply line $L_1$, $L_2$, $L_3$. This device includes electrical motor control and protection equipment C controlling and protecting the motor M, this combination being controlled via an interface module I by an ASI (Actuator Sensor Interface) type field network.

The electrical equipment C constitutes a motor starter and includes a device D to protect the motor (motor circuit-breaker, etc) and one or more contactors KM1, KM2, KM3. These devices can be separate or grouped together, in part or in total, in a single device capable of providing the above functions. The protection device D includes a thermal-magnetic protection module or is associated with a thermal protection relay. It may be made up of separate devices.

A safety contact or binary sensor $a_6$ is associated with the motor M to provide a "safety" signal at an input S of the module I. The protection device D is associated with an auxiliary contact $a_4$ and an auxiliary contact $a_5$.

Figure 1:
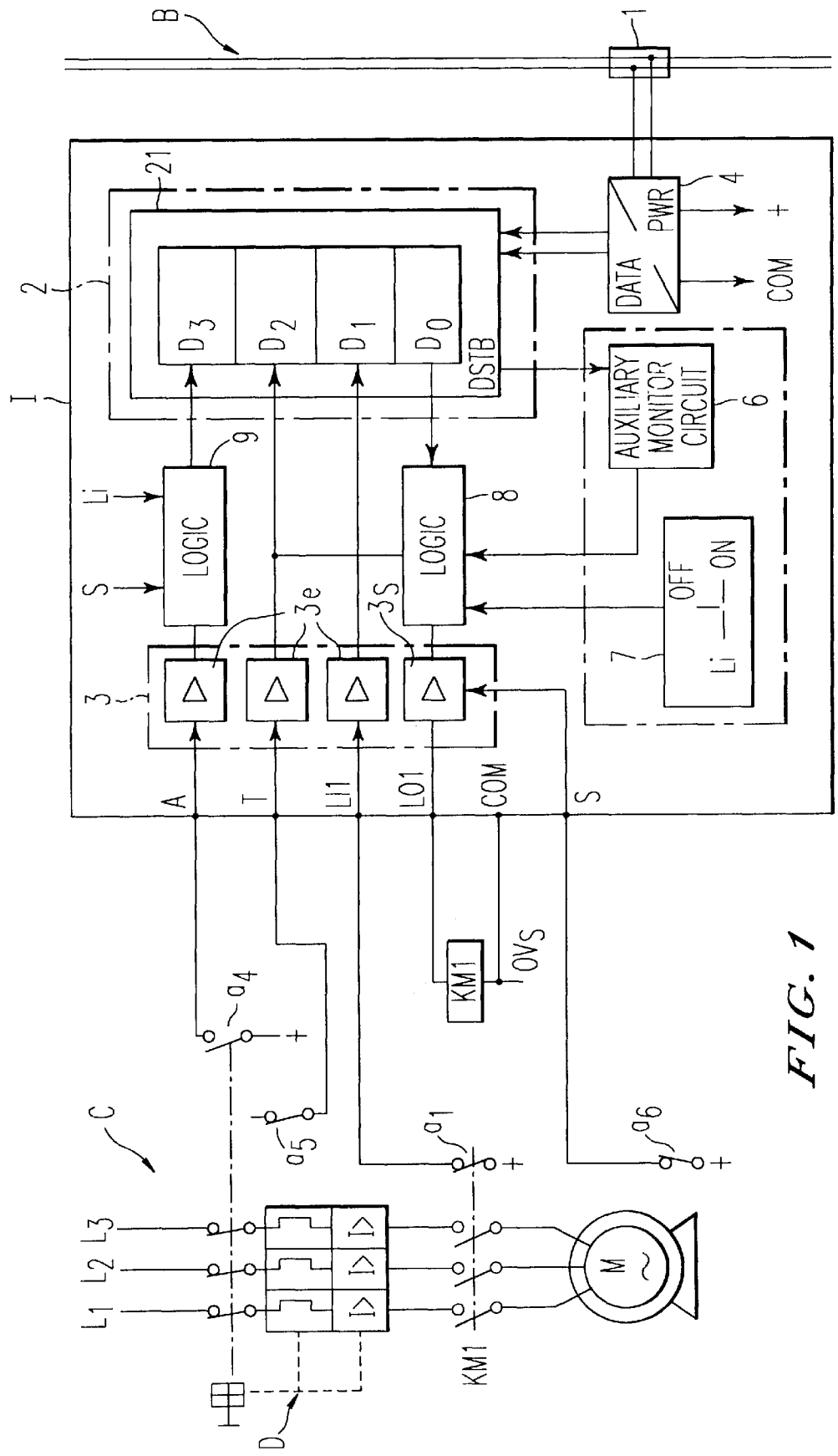
FIG. 1 is a block diagram of a direct on-line starter type motor control and protection system including a first embodiment of the interface module of the invention.
Figure 2:
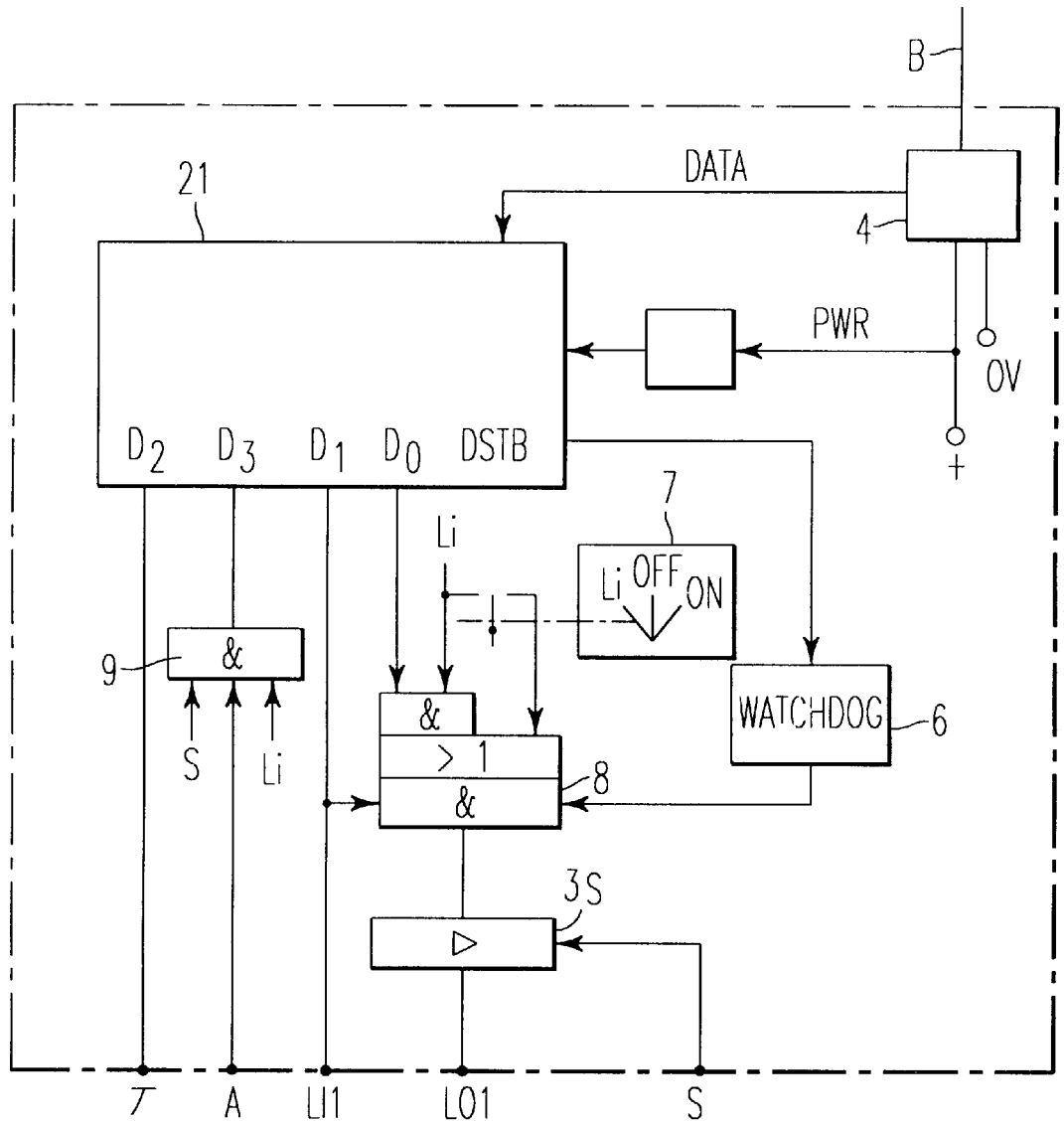
FIG. 2 is a functional block diagram of the module from FIG. 1.

In the direct on-line starter type embodiment of FIGS. 1 and 2 the electrical equipment C comprises only one contactor KM1.

Figure 3:
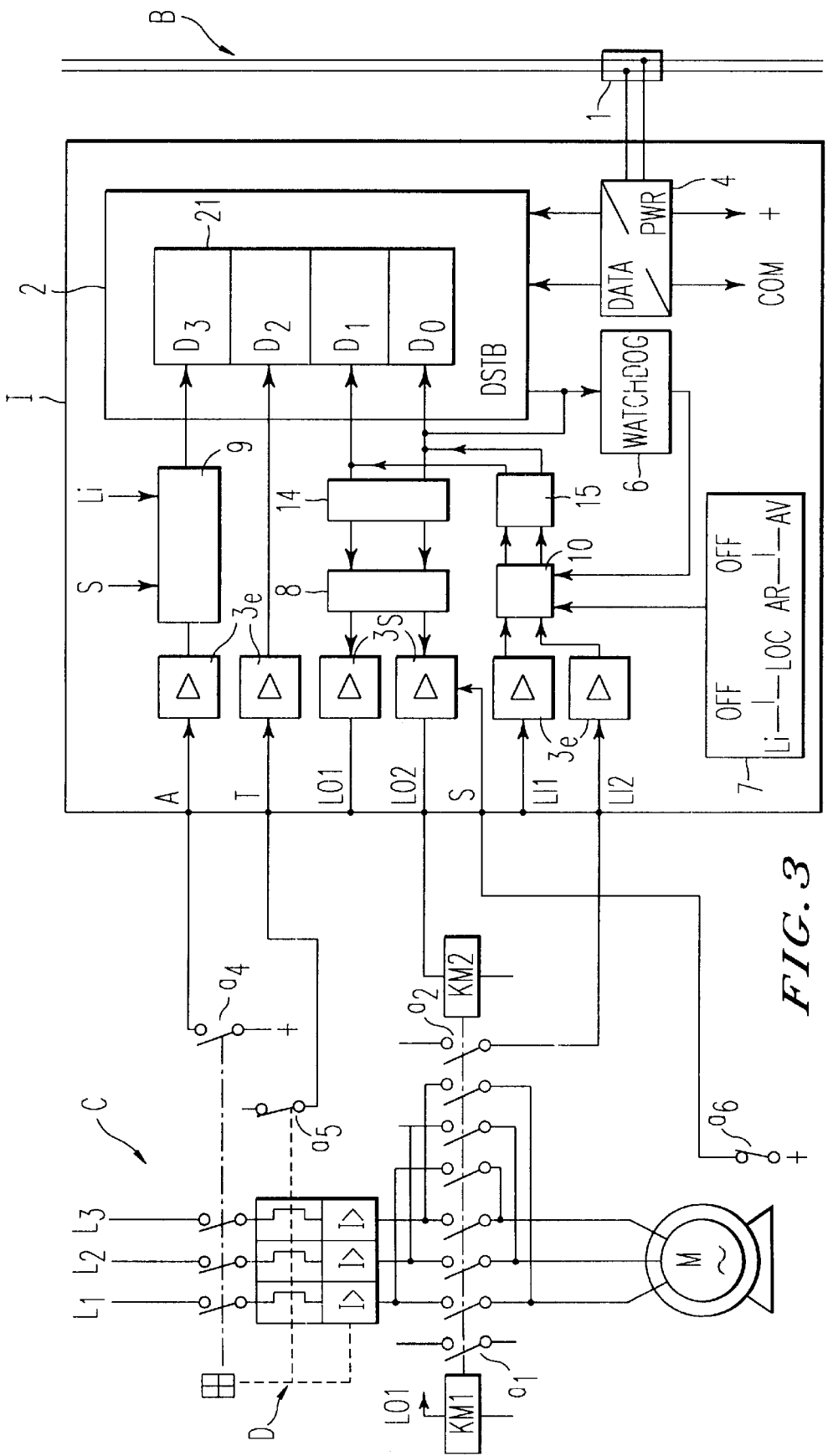
FIG. 3 is a block diagram of a reversing starter type motor control and protection system including a second embodiment of the module of the invention.
Figure 4:
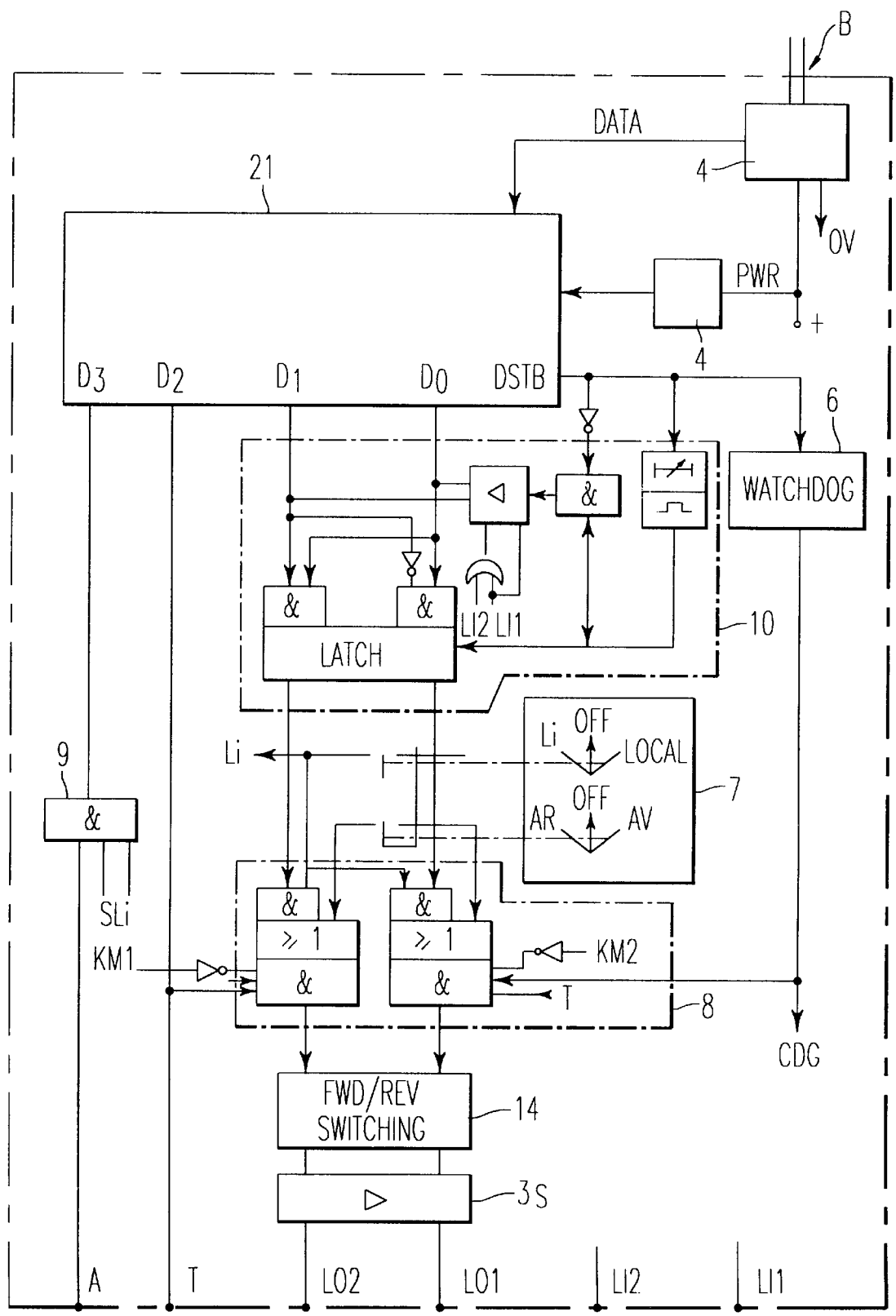
FIG. 4 is a functional block diagram of the module from FIG. 3.

In the reversing starter type embodiment of FIGS. 3 and 4 the electrical equipment C includes two contactors KM1 and KM2. The auxiliary contacts $a_1$ and $a_2$ are respectively associated with the contactors KM1 and KM2.

Figure 5:
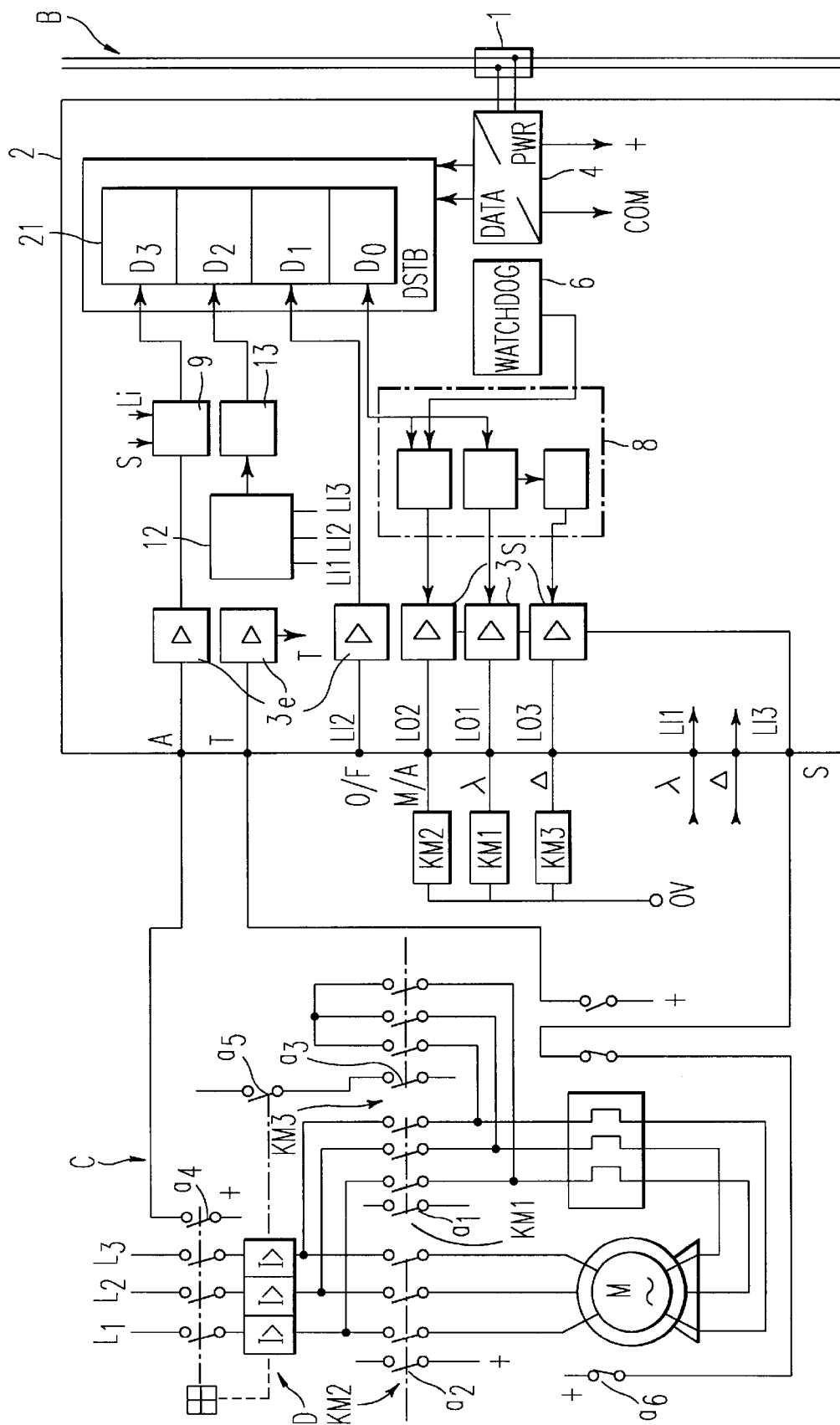
FIG. 5 is a block diagram of a star-delta starter type motor control and protection system including a third embodiment of the interface module of the invention.
Figure 6:
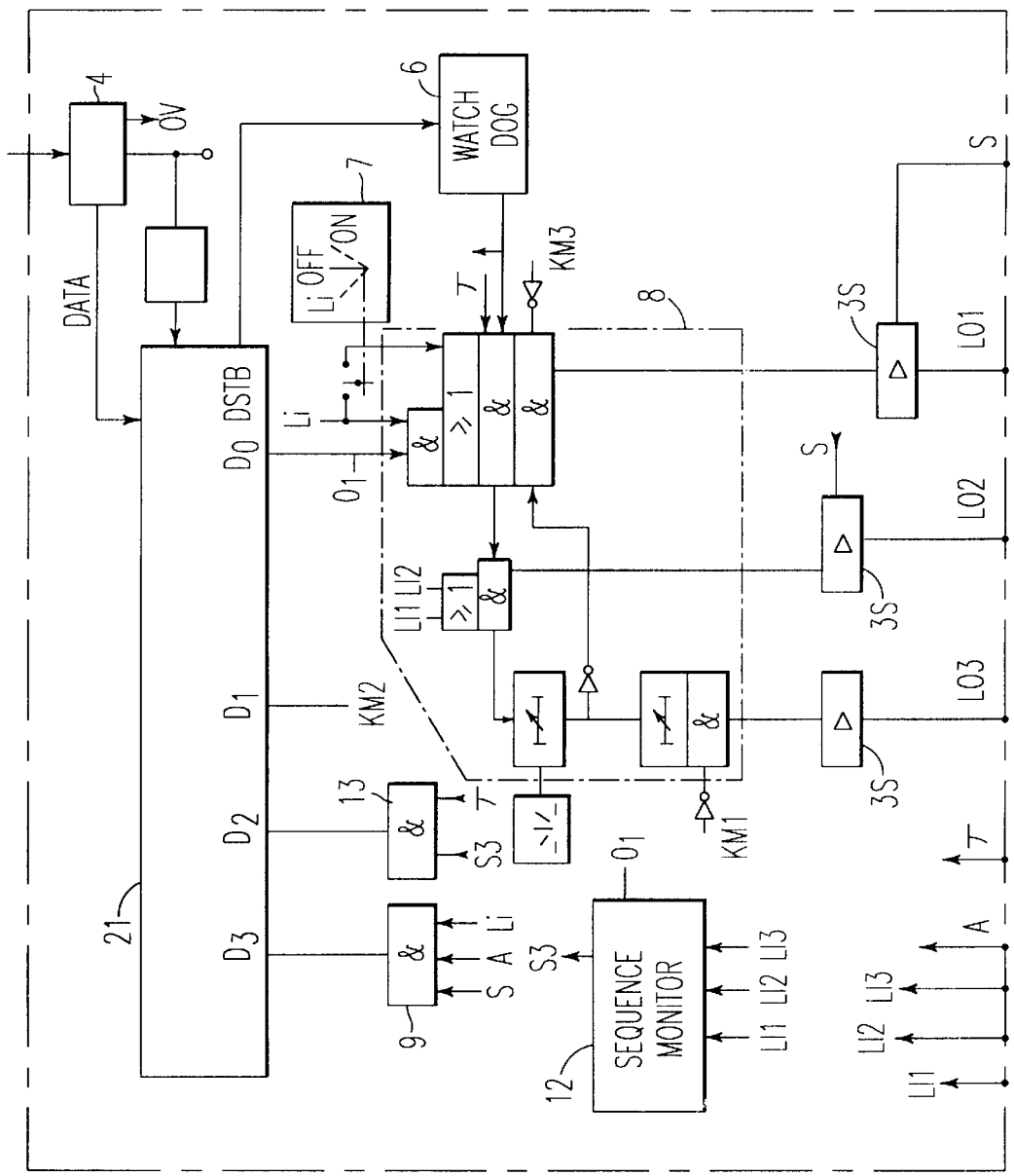
FIG. 6 is a functional block diagram of the module from FIG. 5.

In the star-delta starter type embodiment of FIGS. 5 and 6 the electrical equipment C includes three contactors KM1, KM2, KM3. The auxiliary contacts $a_1$, $a_2$, $a_3$ are respectively associated with the contactors KM1, KM2 and KM3.

The auxiliary contacts could be replaced by binary sensors.

The electrical equipment C is controlled by an ASI type field bus B the physical medium of which comprises two wires carrying information signals and the power supply connections of the sensors and actuators. A control brain that is not shown (PC, programmable automatic controller, etc) controls the network of which the bus B is part, the brain and the bus being connected via a "master" interface module.

The coils of the contactors (or actuators) and the contacts (or binary sensors) of the electrical equipment C are connected to the interface module I which is connected by a connection 1 to the two wires of the bus B. This "slave" interface module I comprises a control unit 2 which decodes requests from the master module, processes data arriving at the inputs and generates commands at the outputs and responses on the bus. The control unit 2 includes an integrated circuit 21 having four data pins (inputs or outputs), four parameter pins and two control outputs. The data pins D0, D1, D2, D3 send binary signals to the coils or receive binary signals from the auxiliary contacts.

Control data from the auxiliary contacts of the equipment C reaches the inputs A, T, LI1, etc. Control data to the coils or actuators of the equipment C is delivered by the outputs LO1, etc. The input/outputs connected to the sensors or actuators of the equipment C are connected via respective input or output interface circuits 3e or 3s to the data pins D0, D1, D2, D3 of the integrated circuit 2. The interface circuits 3e or 3s handle voltage matching (24 volts—5 volts) between the internal electrical circuitry of the module and the inputs or outputs.

In the embodiments shown in the drawings the module I is separate from the equipment C. The inputs and outputs A, T, etc are terminals or connecting members which connect the wires between the module I and the auxiliary contacts or the coils.

As an alternative to this, the module I can be integrated into the electrical equipment C. This eliminates the wiring between the module and the equipment and it remains only to provide the connection between the bus and the combination of the equipment and the module.

The module comprises an interface 4 separating the data from the power supply, monitoring the impedance of the bus and further comprising a device which receives the data present on the bus B and processes it to send it to the control unit 2 or processes data from the control unit 2 to be sent to the bus B.

A DSTB pin of the integrated circuit 21 is connected to an auxiliary monitor circuit 6 (watchdog) which commands switching off of the on/off contactors if dialogue is interrupted between the master module and the slave module (no further communication). The auxiliary circuit 6 receives the signal DSTB from the integrated circuit 21 and supplies an alarm signal to a logic circuit 8 which also receives the control signal from the on/off pin $D_0$ of the integrated circuit 21 (see below). The logic circuit 8 controls an interface circuit 3s.

The module I includes a local control unit 7 mounted on the module and used to select various operating modes manually. This unit is a pushbutton or a lever switch, for example.

Data pins of the integrated circuit 21 have common functions regardless of the modules:

Pin D3 receives signals from an input A which is connected to the auxiliary signaling contact $a_4$ detecting correct operation ("availability") of the protection device D. An additional device can indicate on this pin D3 if the line L1, L2, L3 is on or off.

Pin D2 receives the signal from an input T which is connected to the auxiliary signalling contact $a_5$ associated with the protection device D and/or a device for measuring local heating (thermal sensors). The input signal applied to this pin D2 indicates if a fault current has been detected in the device D protecting the motor.

Pin D1 receives an on/off control signal indicating opening or closing of a contactor.

Pin D0 supplies a binary on/off signal.

The table below summarises the configuration of the pins or data bits for the various types of motor starter.

|  | DIRECT ON-LINE | | STAR/DELTA | | REVERSING | |
| --- | --- | --- | --- | --- | --- | --- |
|  | Control | Status | Control | Status | Control | Status |
| D0 | ON/OFF | | ON/OFF | | ON/OFF | FWD/REV |
| D1 |  | O/C |  | O/C | FWD/REV | O/C |
| D2 |  | Fault |  | Fault |  | Fault |
| D3 |  | Available |  | Available |  | Available |

In the above table, "O/C" means "open/closed".

In the module shown in FIGS. 1 and 2, the auxiliary contact $a_4$ of the protection device is connected to the input A of the module (pin D3). The auxiliary contact $a_5$ of the protection device D is connected to the input T of the module (pin D2). The auxiliary contact $a_1$ of the contactor KM1 is connected to the input LI1 of the module (pin D1).

The output LO1 (pin D0) of the module is connected to one terminal of the coil of the contactor KM1. The latter's other terminal (COM) is connected to earth. The control unit 7 has an "OFF" position, an "ON" position and a "Li" position (remote control via the bus).

The logic circuit 8 which monitors the signal at the output LO1 receives the alarm signal from the monitor circuit 6 and the output signal from the local control unit 7 in addition to the output signal at pin D0.

A logic circuit 9 receives the signals from the inputs S and A in addition to the signal Li from the local control unit 7. The bit D3 assumes a state indicating that the protection device is available.

In the module shown in FIGS. 3 and 4 the auxiliary contact $a_4$ of the protection device D is connected to the input A of the module (pin D3). The auxiliary contact $a_5$ of the thermal-magnetic module F1–F2 is connected to the input T of the module. The auxiliary contact $a_1$ of the contactor KM1 (forward sensing) and the auxiliary contact $a_2$ of the contact KM2 (reverse sensing) are connected to the inputs LI1 and LI2, respectively.

The outputs LO1 (forward) and LO2 (reverse) are connected to the coils of the contactors KM1 and KM2, respectively. The two pins D0 and D1 are bidirectional data pins.

The local control unit 7 can assume an "OFF" position, an "ON" position and a "Li" (remote control) position and is associated with a second control unit that can assume a "forward" ("FWD") position, an "OFF" position and a "reverse" ("REV") position.

The circuit 10 which receives signals from the inputs LI1 and LI2 sets the bit D1 either to "on" or to "off" and the bit D0 either to "forward" or to "reverse". Bit D1 selects "on" or "off" and bit D0 selects "forward" or "reverse". The circuit 15 controls the bidirectional exchange of data at the pins D0 and D1.

Depending on the states of the bits D1 and D0, the switching circuit 8 activates the output LO1 (forward) or the output LO2 (reverse) or, depending on the state of the bit D1, selects on/off. This circuit 8 receives the output signal from the monitor circuit 6 to set the outputs LO1 and LO2 to "off" if the monitor circuit 6 outputs the alarm signal. A circuit 14 controls "forward"—"reverse" switching without interruption.

The logic circuit 9 receives signals from inputs S and A in addition to the signal Li from the local control unit 7. The bit D3 assumes a state indicating that the protection device is available.

In the module shown in FIG. 5 and 6 the auxiliary contact $a_4$ of the protection device D is connected to the input A of the module (pin D3). The auxiliary contact as of the protection device D is connected to the input T of the module. The auxiliary contact $a_2$ associated with the contactor KM2 (on/off) is connected to the input LI2. The auxiliary contact $a_1$ of the contactor KM1 (star starter) is connected to the input LI1 and the auxiliary contact $a_3$ of the contactor KM3 (delta starter) is connected to the input LI3.

The output LO2 is connected to the coil of the on/off contactor KM2, the output LO1 is connected to the coil of the contactor KM1 (star starter) and the output LO3 is connected to the coil of the contactor KM3 (delta starter).

The control unit 7 has an "OFF" position, an "ON" position and a "Li" position (remote control via the bus).

The switching circuit 8 which monitors the output signals at the outputs LO1, LO2, LO3 receives the alarm signal from the monitor circuit 6, the output of the local control unit 7 and the output signal from pin D0. It also receives timing data needed for star/delta starter switching.

The circuit 9 receives signals from the inputs S and A in addition to the signal Li from the local control unit 7. The output of this circuit 9 is connected to the pin D3. The bit D3 has an "availability" state indicating that the installation is in working order.

The sequence monitor circuit 12 receives input signals from the inputs LI1, LI2, LI3 and its output supplies an enabling signal to an AND gate 13 connected to the data pin D2 and receiving the input signal T. All of the star-delta starting sequence is conducted and if the sequence finishes correctly the circuit 12 sends the enabling signal.

It is to be understood that, without departing from the scope of the invention, it is possible to envisage variants and improvements of detail and even to consider the use of different means equivalent to those described.

We claim:

1. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins; and a second logic circuit which connects at least one output of said third predetermined number of outputs to at least one of said first predetermined number of data pins, said second logic circuit controlling said actuators of said electrical equipment, wherein a total number of said second predetermined number of inputs and said third predetermined number of outputs is greater than said first predetermined number of data pins of said integrated circuit, and wherein each of said first predetermined number of data pins corresponds to at least one of a control data pin and status data pin for a plurality of starter motors.

2. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins; and a second logic circuit which connects at least one output of said third predetermined number of outputs to at least one of said first predetermined number of data pins, said second logic circuit controlling said actuators of said electrical equipment, wherein a total number of said second predetermined number of inputs and said third predetermined number of outputs is greater than said first predetermined number of data pins of said integrated circuit, and wherein a first data pin of said first predetermined number of data pins corresponds to an ON/OFF bit, a second data pin of said first predetermined number of data pins corresponds to an OPEN/CLOSED bit, a third data pin of said first predetermined number of data pins corresponds to a FAULT/NO FAULT bit, and a fourth data pin of said first predetermined number of data pins corresponds to an ON bit.

3. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins;

a second logic circuit which connects at least one output of said third predetermined number of outputs to at least one of said first predetermined number of data pins, said second logic circuit controlling said actuators of said electrical equipment; and a monitor logic circuit which detects an absence of dialogue between said interface module and said second logic circuit, wherein a total number of said second predetermined number of inputs and said third predetermined number of outputs is greater than said first predetermined number of data pins of said integrated circuit.

4. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins;

a second logic circuit which connects at least one output of said third predetermined number of outputs to at least one of said first predetermined number of data pins, said second logic circuit controlling said actuators of said electrical equipment; and a third logic circuit which connects a first bidirectional data pin and a second bidirectional data pin of said first predetermined number of data pins to at least two inputs of said second predetermined number of inputs, wherein a total number of said second predetermined number of inputs and said third predetermined number of outputs is greater than said first predetermined number of data pins of said integrated circuit, wherein said second logic circuit connects said first bidirectional data pin and said second bidirectional data pin to at least two outputs of said third predetermined number of outputs, wherein said at least two inputs are connected to auxiliary contacts associated with said actuators, and wherein said at least two outputs are connected to said actuators which control a reversing starter motor.

5. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins; and a second logic circuit which connects at least one output of said third predetermined number of outputs to at least one of said first predetermined number of data pins, said second logic circuit controlling said actuators of said electrical equipment, wherein a total number of said second predetermined number of inputs and said third predetermined number of outputs is greater than said first predetermined number of data pins of said integrated circuit, and wherein said second logic circuit connects a first data pin of said first predetermined number of data pins to at least three outputs of said third predetermined number of outputs.

6. The interface module according to claim 5, wherein said at least three outputs are connected to said actuators which control a star-delta starter motor.

7. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins;

a second logic circuit which connects at least one output of said third predetermined number of outputs to at least one of said first predetermined number of data pins, said second logic circuit controlling said actuators of said electrical equipment; and a sequence monitor connecting at least three inputs of said second predetermined number of inputs to a first data pin of said first predetermined number of data pins, wherein a total number of said second predetermined number of inputs and said third predetermined number of outputs is greater than said first predetermined number of data pins of said integrated circuit.

8. The interface module according to claim 7, wherein said at least three inputs are connected to auxiliary contacts of a star-delta starter motor.

9. An interface module connected between a field bus and electrical equipment which controls and protects an electric motor, said electrical equipment having auxiliary contacts and actuators, comprising:

an integrated circuit having a first predetermined number of data pins;

an input/output circuit having a second predetermined number of inputs and a third predetermined number of outputs, said second predetermined number of inputs receive data from said auxiliary contacts of said electrical equipment and said third predetermined number of outputs output data to said actuators of said electrical equipment;

a first logic circuit which connects at least one input of said second predetermined number of inputs to at least one of said first predetermined number of data pins;

a second logic circuit which connects at least one output of said third predetermined number of outputs to at least one of said first predetermined number of data pins, said second logic circuit controlling said actuators of said electrical equipment;

a local control unit having an output corresponding to at least one of an ON, OFF, Remote Control, Forward, and Reverse command; and a third logic circuit which connects at least two inputs of said second predetermined number of inputs and said output of said local control unit to a first data pin of said first predetermined number of data pins, wherein a total number of said second predetermined number of inputs and said third predetermined number of outputs is greater than said first predetermined number of data pins of said integrated circuit.

* * * * *